United States Patent [19]

Lyons

[11] 4,276,901
[45] Jul. 7, 1981

[54] HIGH FLOW PRESSURE RELIEF VALVE

[75] Inventor: Jerry L. Lyons, St. Louis County, Mo.

[73] Assignee: Essex Cryogenics of Missouri Inc., St. Louis, Mo.

[21] Appl. No.: 79,378

[22] Filed: Sep. 27, 1979

[51] Int. Cl.³ .......................................... F16K 17/20
[52] U.S. Cl. ................................. 137/469; 137/472; 137/536; 137/541
[58] Field of Search ............... 137/469, 472, 541, 536

[56] References Cited

U.S. PATENT DOCUMENTS

| | | | |
|---|---|---|---|
| 287,007 | 10/1883 | Cullingworth | 137/541 |
| 2,072,271 | 3/1937 | Meadows | 137/541 |
| 2,506,737 | 5/1950 | Paquin | 137/469 |
| 3,160,332 | 12/1964 | Brunson | 137/469 X |
| 3,335,751 | 8/1967 | Davis | 137/541 |
| 3,702,141 | 11/1972 | Wetterhorn | 137/469 |
| 4,074,696 | 2/1978 | Romanowski | 137/541 X |

Primary Examiner—Harold W. Weakley
Attorney, Agent, or Firm—Kalish & Gilster

[57] ABSTRACT

A fluid pressure relief valve provides automatic venting of a high pressure source to an area of lower pressure in response to pressure build-up of the source. The valve includes a valve body in which a recess is provided, a passage providing communication between one end of the recess and the source. A poppet is oriented for movement with respect to the recess and includes a sealing element adapted to close the other end of the recess by sealing engagement with the valve body. A spring urges the poppet toward sealing engagement. The poppet has ports proximate the sealing element which are covered when the sealing engagement is maintained but are uncovered progressively with movement of the poppet out of sealing engagement. If the source pressure exceeds a predetermined threshold level, the poppet is driven increasingly away from the sealing engagement with increase in pressure of the source for progressively uncovering the ports in response to dynamic impact upon the poppet by fluid flow through the valve. The fluid flow exhibits substantially no divergence or pressure drop within the valve to provide high volumetric flow therethrough.

7 Claims, 8 Drawing Figures

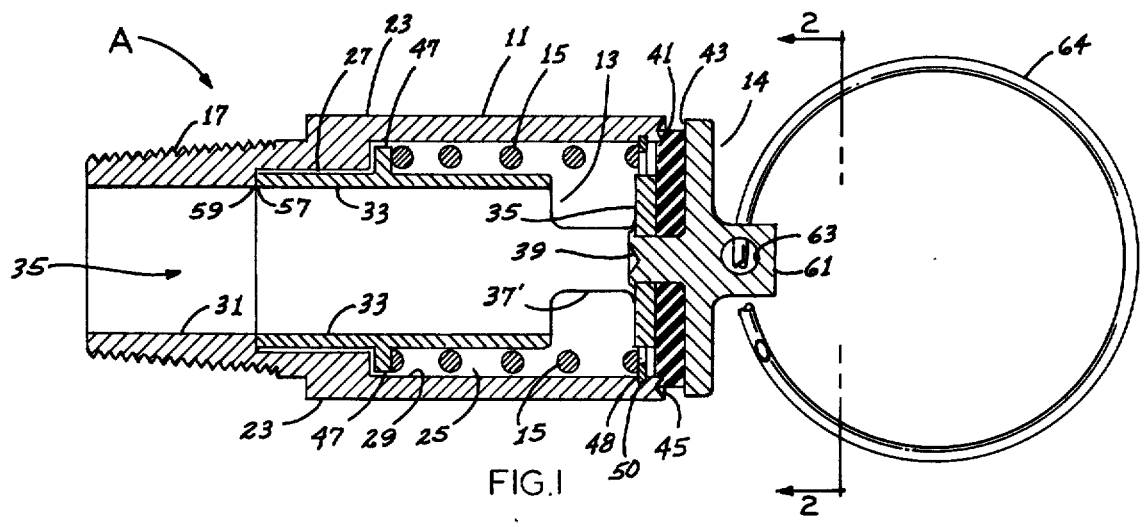
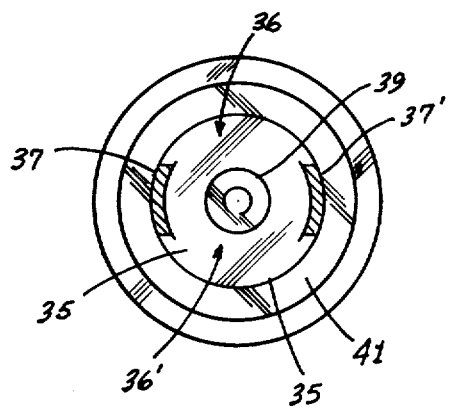
FIG. 4
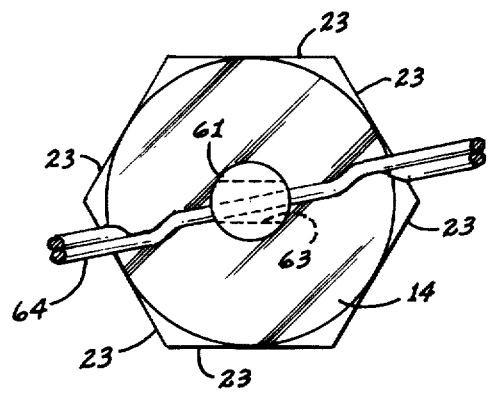
FIG. 2
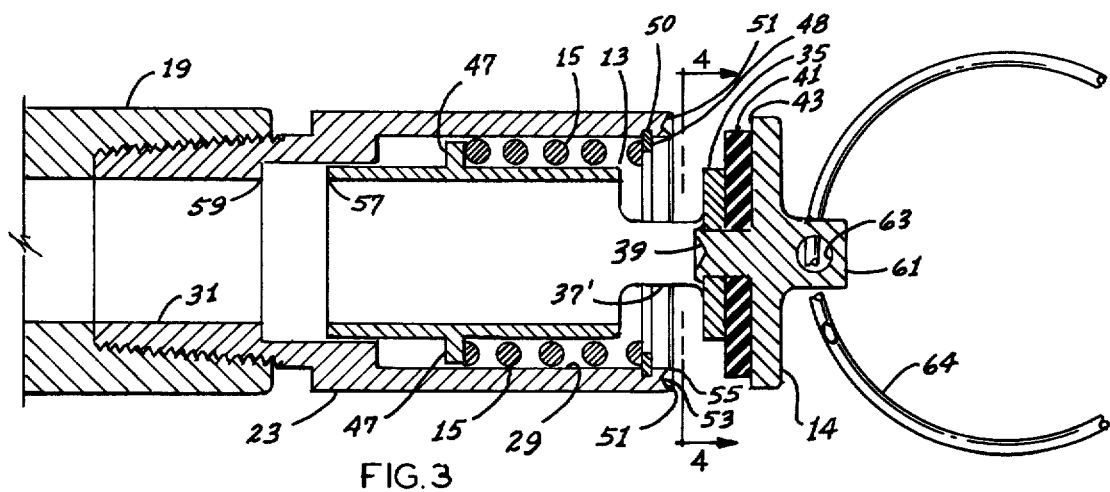
FIG. 3

HIGH FLOW PRESSURE RELIEF VALVE

BACKGROUND AND SUMMARY OF THE INVENTION

This invention relates to safety relief valves and, more particularly, to a compact safety relief valve having high volumetric flow.

Heretofore, safety relief valves have typically incorporated a poppet, a spring for biasing the poppet toward a position closing the valve, and various sections or structure within the flow path to support and guide the poppet and spring.

These various items all constrict the flow of the fluid, such as gas, which the valve is intended to control by causing various conditions such as turbulence, cavitation and the formation of one or more vena contractas. In effect, these constrictive conditions give rise to a lower pressure downstream from the position in which they are present. The difference between the upstream and downstream pressures is referred to as pressure drop or $\Delta P$.

Generally speaking, when a medium flows through a restriction, a flow pattern is formed in which the area of flow is less than the area of the opening through which it flows. This results in what is termed a "vena contracta" at the point where the flow velocity is the highest and pressure is at its lowest which further restricts the flow of the medium. If the formation of a vena contracta can be avoided within a valve and can be formed instead outside of the valve in the region in which the valve is intended to vent high pressure, no resultant restriction occurs.

Accordingly, an object of the invention is the provision of an improved pressure relief valve which can be utilized as a safety device to vent fluids, primarily gases, from a higher pressure source such as a tank, vessel, pipe, etc., to a region of lower pressure, such as the atmosphere.

A further object of the invention is the provision of such a pressure relief valve which is particularly well suited to the venting of dangerous pressure levels within transformers of the power transmission type.

A still further object of the invention is the provision of such a pressure relief valve which is adapted to provide high volumetric flow therethrough during pressure venting operation in comparison with the size of the valve.

Another object of the invention is the provision of such a pressure relief valve which provides essentially negligible or zero pressure drop across the valve during venting operation being thus extremely efficient during venting operation.

Another object of the invention is the provision of such a pressure relief valve of the poppet type wherein fluids, such as gas, may flow through the valve during pressure relief thereby without being restricted by the poppet, poppet springs or structure of the valve and without formation of a vena contracta within the valve.

Yet another object of the invention is the provision of such a pressure relief valve which opens a predetermined pressure threshold but closes at a lower pressure value.

Among other objects of the invention may be noted the provision of such a pressure relief valve which provides a novel seal arrangement; which is reliable and long-lasting in operation; which is immersible in fluids without effecting its operation; which can be utilized in corrosive atmospheres; which can be manually operated; and which is simple and economical of manufacture.

Other objects and features will be in part apparent and in part pointed out hereinbelow.

BRIEF DESCRIPTION OF THE DRAWINGS

FIG. 1 is a longitudinal cross-sectional view of a pressure relief valve constructed in accordance with and embodying the invention.

FIG. 2 is a right end elevational view of the new valve.

FIG. 3 is a longitudinal cross-sectional view similar to FIG. 1, but illustrating a poppet of the valve in open position.

FIG. 4 is a transverse cross-sectional view taken along line 4—4 of FIG. 3.

Corresponding reference characters indicate corresponding parts throughout the several views of the drawings.

DESCRIPTION OF THE PREFERRED EMBODIMENT

Figure 5:
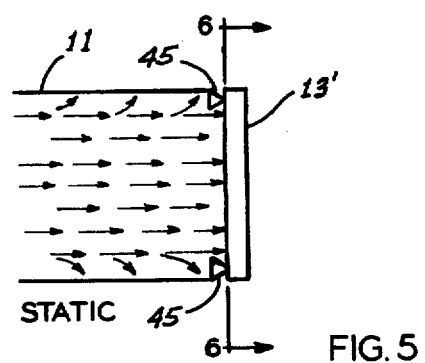
FIG. 5 is a simplified diagramatic representation of the longitudinal cross-section of the new valve.

Referring now to FIGS. 1-4 of the drawings, a new pressure relief valve of the invention is designated generally by reference character A. Valve A is intended for use as a safety valve for venting of excess pressure which could, for example, develop within a power transmission transformer. In such transformers, pressure build-up to a dangerous level must be vented from within the transformer containment vessel to a region of lower pressure, e.g., the atmosphere, outside of the vessel.

Although primarily for venting of gases, valve A may be utilized for venting of various and myriad fluids from a higher pressure source such as a tank, vessel, pipe, etc., to a lower pressure region. With regard to use of the new valve for venting of high pressure from a transformer vessel, it is desired that the valve be capable of venting at a relatively high volumetric flow rate if the pressure in the vessel should exceed a predetermined threshold. In such usage, the valve should have the capability of continuing to vent until the souce pressure has dropped to a value below such threshold. Further, the valve should be capable of reliable operation under extreme conditions such as underwater or in a corrosive condition.

A valve of the invention not only provides such capabilities of usage but is capable of venting fluids without substantial pressure drop within the valve whereby its operation is extremely efficient, being essentially equivalent to that of a straight pipe or tube, wherein pressure drop or $\Delta P$ of the fluid flow therethrough approaches zero.

Fundamentally, valve A comprises a valve body 11 in which is fitted a movable poppet 13, including a cap 14, which is biased toward sealing engagement, i.e., for closing the valve, by a compression spring 15.

More specifically, valve body 11 is of generally tubular configuration, being preferably machined of brass, stainless steel, or other alloys, including a threaded stem 17 suited for being threaded into a conventional topped bore of a transformer or other pressure source vessel or fitting, such as that illustrated at 19 in FIG. 3. Stem 17 is preferably tapered whereby a tightly sealed relationship with the pressure source 19 is attained.

An enlarged diameter portion 21 of the valve body extends outwardly from stem 17, being preferably provided with a hexagonal cross-sectional configuration, as seen in FIG. 2, so that flats 23 are provided around the periphery of the valve body for permitting the new valve to be tightened by a wrench.

Valve body 11 is concentrically bored to provide a recess 25 having a first diameter section 27 and a larger diameter portion 29 extending outward therefrom. A bore 31 of still smaller diameter through stem 17 provides communication between pressure source 19 and recess 25.

Fitted within recess 25 is a tubular sleeve 33 of the poppet. Sleeve 33 has an outer diameter which is very nearly the same as the inner diameter of recess portion 27 for being axially slidable therein in close fitting relationship. The inner diameter of sleeve 33 is the same as the inner diameter of passage 31 whereby a continuous constant diameter passageway 35 of circular cross-section is achieved through stem 17 and sleeve 33. Sleeve 33 is preferably of the same material as valve body 11.

At the outer end of poppet sleeve 33, the poppet is provided with a disc-like head or closure 35 lying in a plane normal to the longitudinal axis of the valve recess and poppet. But provided proximate said head are two oppositely disposed openings or ports 36,36' which are defined by cut-away portions of the sleeve so as to leave two relatively narrow necked-down regions 37,37' of the valve which join head 35 at its opposite edges. The diameter of head 35 is the same as the outer diameter of sleeve 35.

Cap 14 is secured to head 35 by means of stem 39, which is upset like a rivet for securement to the head but may instead be threaded into the head. But located between head 35 and cap 14 is a disc-shaped seal 41 of resiliently deformable material such as a synthetic elastomer commercially available under the trademark "VITON". Cap 14 has a diameter slightly greater than the inner diameter of bore 29 but slightly less than the effective outer diameter of valve 11 whereby there is defined a flange 43 adapted for causing seal 41 to be urged against a seat 45 in sealing relationship for closing the outer end of recess 13 and thus closing the valve.

For this purpose, sleeve 33 is provided with an annular flange or rib 47 on the outer surface of its midportion and against which spring 15 is adapted to bear. The other end of the spring bears against a snap ring 48 fitted in a groove 50 extending around the inner surface of bore 29 proximate seat 45.

Seat 45 is defined by a V-shaped groove 51 axially outward from valve body portion 21 whereby seal 41 is caused to be seated within such groove so that the outer periphery contacts the apex 53 of the groove but with seal 41 being also in contact with a sharp-edged lip 55 defined by the inner periphery of seat 45. This provides, in effect, two lines of seal to doubly ensure sealing relationship of cap 14 with valve body 11. In addition, the sharp inner edge 55 causes a slight deformation of seal 41 for ensuring sealing, but without permanent deformation of the seal resulting.

When poppet 13 is thus in the position shown in FIG. 1, so that the valve is closed, the inner end 57 of sleeve 33 is very closely adjacent the outer end 59 of bore or passage 31.

Cap 14 is provided with an outer stem extension 61 having slightly greater diameter than stem 39. Stem extension is provided with an aperture 63 transversely therethrough for receiving a conventional pull ring or bail 64 of spring wire and of sufficient diameter to permit one to insert a finger for pulling ring 64 outward for opening the poppet manually to vent gas or other fluid through the valve, as for safety purposes, or to permit manual use of the valve for venting source 19 to zero pressure.

The new valve is shown considerably enlarged in the drawings. In actuality, the valve may be quite small. Stem 17 may be threaded, for example, as ¼ in. national pipe thread, and with the overall length of the valve, exclusive of ring 64, being on the order of about 42 mm. and having a diameter of body portion 21 of about 17 mm., and the inner diameter of passage 31 being about 10 mm. Yet, such valve is capable of venting to about 70 SCFM of gas at 70° F. (21° C.) without substantial pressure drop across the valve and without constrictions caused by various conditions, such as turbulence, cavitation, or vena contracta formation. The valve, having substantially none of these conditions, has almost zero $\Delta P$ (pressure drop) due to flow resistance. Therefore, the flow of fluids, including gases, through the valve is substantially equivalent of the theoretically perfect and most efficient straight pipe or tube.

Operation of the valve for pressure venting purposes is illustrated in FIG. 3 wherein poppet 13 and its cap 14 are shown to have moved outwardly from valve body 11 to provide communication between recess 25 and the lower pressure region outside of the valve, whereby fluid, i.e., gas under pressure, flows from source 19 and through aperture 31 and thence through sleeve 33 and ports 36,36'.

FIG. 3 depicts poppet 13 in a position in which substantial venting is occurring, but it will be understood that initially seal 41 is seated on seat 45 in tightly sealed relationship by virtue of the force of spring 15. The poppet does not move out of sealing engagement until the source pressure, i.e., the pressure differential between that of source 19 and that of the outside region (typically atmospheric), exceeds a predetermined threshold such as, for example, 8–10 PSIG.

Poppet 13 progressively moves away from valve body 11 as pressure exceeds the predetermined threshold level, thereby progressively uncovering ports 36,36' for providing a progressively increasing fluid flow area between the periphery of cap 14 and seat 45. Thus, there is progressively increasing volumetric flow of fluid through the valve. By virtue of the relatively large area of ports 36,36', poppet 13 needs to move outward from valve body 11 only about one-fourth of the inner diameter of poppet sleeve 33 to provide a venting, i.e., fluid flow, area equal to the cross-sectional area of poppet sleeve 33.

Figure 6:
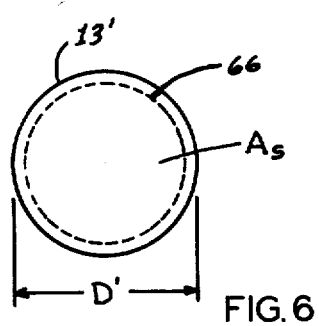
FIG. 6 is a view of a simplified representation of the seal area of a poppet of the new valve.

Referring to FIGS. 5–8, valve body 11 is depicted in simplified diagrammatic form, with poppet 13 and its ported sleeve 33 and cap 14 being depicted as a simple plate closure 13' impinging against seat 45 to define, as shaded in FIG. 6, a circular seal line 66 bounding area $A_s$. Under the static conditions represented in FIG. 5, there is a static pressure force, $F_{stat}$, upon area $A_s$ just prior to the operating pressure P (i.e., the differential between the absolute pressure in source 19 and the absolute pressure in the region outside the valve) which is $$F_{stat} = A_s P. \qquad \text{(Equ. 1)}$$

Figure 7:
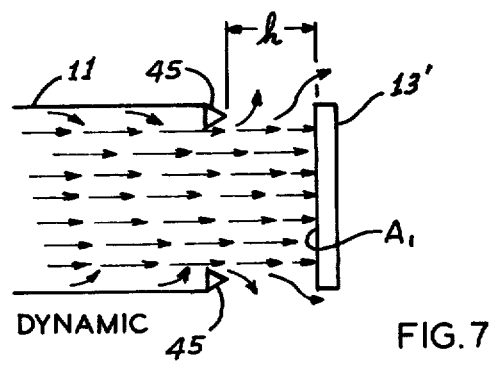
FIG. 7 is a simplified diagramatic representation of a longitudinal cross-sectional view of the valve when the poppet is in the open position.
Figure 8:
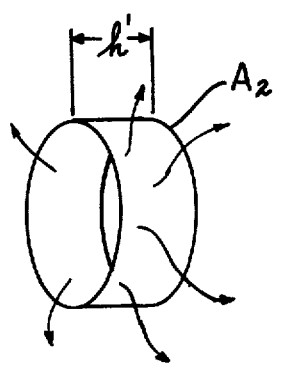
FIG. 8 is a simplified representation of a cross-sectional area being vented by the valve during fully open condition.

But when the poppet opens, there is a dynamic pressure force, $F_{dyn}$, working on the poppet due to flow which is $$F_{dyn} = \frac{\rho V^2 A_1}{2g} \qquad \text{(Equ. 2)}$$

where $\rho$ is the density of the fluid (lbs/ft$^3$), V is the fluid velocity (ft/sec) and g is the constant of gravitational acceleration, or 32.2 ft/sec/sec, with the area, $A_1$, being the area of fluid pushing on the poppet equivalent 13′ as depicted in FIG. 7, being somewhat greater than $A_s$ since the entire equivalent face (having a diameter D′) of the poppet is now exposed.

At full flowing conditions, an effective flow area $A_2$ (FIG. 8) is created which is given by $\pi D'h'$, h′ being the effective height of the flow area resulting from displacement of the poppet and corresponding to an actual outer displacement h of the poppet. There is then a force of the poppet upon spring 15 which is the stagnation pressure force, $F_{stag}$, of the valve and is the sum of the static pressure force and the dynamic pressure force, $$F_{stag} = A_s P + \frac{\rho V^2 A_1}{2g}.$$

Under these conditions, the flow area $A_2$ must be equal to the seal area $A_s$.

By virtue of the new design, the fluid such as gas being vented, will keep the jet of the flow in a perfect stream to the back of the poppet seal area without divergence for at least 2½ poppet diameters, i.e., the inner diameter of sleeve 33. Such is far greater than the actual outward displacement h of the poppet.

Accordingly, the design is such that the force due to the flow of fluid impacting dynamically upon the poppet is much greater than would be needed in order to have a spring force low enough to pass full flow without restricting the flow area.

Typically, a valve of the above-stated dimensions is capable of providing for the venting of 70 SCFM at 15 PSIG outlet pressure while preventing divergence for at least 2½ poppet diameters, thus achieving unexpectedly high flow for such a compact valve.

Since the flow of fluid dynamically impacts or impinges upon the full effective diameter D′ of the poppet seal when the poppet is open, rather than only upon the seal area $A_2$, the valve is prevented from closing until the pressure has decreased to a value substantially less than the predetermined pressure threshold at which cracking (i.e., opening of the poppet) first occurred. For example, the valve is prevented from closing until the pressure has decreased to a minimum of about 6 PSIG.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed and desired to be secured by Letters Patent is:

1. A gas pressure relief valve for automatic venting of a high pressure source to an area of lower pressure with high volumetric flow in response to pressure build-up of said source, said valve comprising a valve body, an elongated recess in said body, a passage connecting one end of said recess with said source for receiving fluid flow therefrom through said recess toward the opposite end thereof, a poppet element fitted in said recess other end and adapted for normally closing said other end, said poppet element including a tubular sleeve fitted axially and slidably within said recess, said sleeve opening at one end into said passage, a closure extending across the other end of said sleeve and configured for providing a gas-tight sealing engagement with said valve body at said opposite end of said recess, said sleeve defining a second passage having a transverse cross-sectional area at least as great as that of the first said passage, said second passage being of substantially constant diameter and forming with said first passage a flow path through said valve substantially devoid of any constriction productive of a vena contracta within said flow path, said sleeve having at least one gas release port providing a cross-sectional area at least as great as the transverse cross-sectional area of said second passage, said port being proximate said closure, means for resiliently urging said poppet element toward said one end of said recess defining a valve seat for maintaining said gas-tight sealing engagement, said valve body terminating substantially commensurate with said valve seat, thereby to avoid extending beyond said poppet any fluid flow restrictive structure, said poppet element being axially movable away from said valve seat of said recess in response to a predetermined value of gas pressure differential between said source and area of lower pressure for opening said port to said area of lower pressure, said sleeve effectively defining a nozzle for maintaining a constant dynamic pressure upon said closure upon movement of said poppet element away from said valve seat, said poppet element upon said movement introducing into said flow path no constriction productive of a vena contracta within said flow path, the extent of opening of said port being dependent upon the differential in gas pressure between said source and lower pressure area, said poppet being maintained in a position opening of said port by the dynamic impact of a gaseous stream flowing through said second pressure against said closure, and whereby said gaseous stream during flow along said flow path exhibits substantially no divergence within said valve, said closure being flanged, said closure including an area of sealing engagement with said valve body having a sealed diameter which is less than the effective diameter of said flanged closure, said flanged closure extending across said gaseous stream during said flow, said impact of said gaseous stream upon said flanged closure thereby preventing said closing engagement with said valve body until said gas pressure differential is less than said predetermined valve.

2. A pressure relief valve according to claim 1, said second passage, sleeve and port being so configured and dimensioned when said poppet elements are fully moved away from said sealing engagement that said fluid flow through said valve exhibits substantially no divergence for a distance downstream of said port of approximately 2.5 inside diameters of said sleeve.

3. A pressure relief valve according to claim 1 wherein said means for resiliently urging said poppet element comprising a coil spring fitted axially within said recess and surrounding said sleeve, said spring having one end bearing axially against said valve body and the other end bearing axially against said sleeve, said recess and sleeve being cylindrical, said recess having a first diameter portion toward said one end thereof for receiving said sleeve in close fitting slidable relationship, and a larger diameter portion for receiving said coil spring, said sleeve having an annular protrusion receivable in said larger diameter recess portion in close fitting slidable relationship, said spring bearing at one end against said protrusion, an annular groove within said larger diameter recess portion at one end thereof remote from said first diameter portion, a snap ring in said groove, said spring bearing at its opposite end against said snap ring.

4. A pressure relief valve according to claim 1 wherein said valve body defines a sharp-edged seat for sealing thereagainst of said flanged closure, said flange of said closure carrying resiliently deformable sealing material adapted for bearing against said seat deformably.

5. A pressure relief valve according to claim 1 wherein said first and second passages are circular in transverse cross-section and have substantially identical diameters.

6. A pressure relief valve according to claim 1 wherein said valve body defines a threaded fitting for being received by a corresponding threaded aperture, said fitting extending axially from said recess, said first passage extending coaxially through said fitting.

7. A pressure relief valve according to claim 1 wherein said dynamic pressure upon said closure is given by $\rho V^2 A_1/2g$ where $\rho$ is the density of the gas flowing in said flow path, V is the fluid velocity, g is the constant of gravitational acceleration, and $A_1$ is the equivalent area of the closure exposed to said dynamic pressure upon movement of said poppet element away from said valve seat.

* * * * *